US009841075B2

(12) United States Patent
Russo (10) Patent No.: US 9,841,075 B2
(45) Date of Patent: Dec. 12, 2017

(54) PROTECTIVE ATHLETIC EQUIPMENT

(71) Applicant: ROUSSEAU RESEARCH, INC., Palo Alto, CA (US)

(72) Inventor: Joseph D Russo, Palo Alto, CA (US)

(73) Assignee: Rousseau Research, Inc., Palo Alto, CA (US)

( * ) Notice: Subject to any disclaimer, the term of this patent is extended or adjusted under 35 U.S.C. 154(b) by 655 days.

(21) Appl. No.: 14/052,642

(22) Filed: Oct. 11, 2013

(65) Prior Publication Data

US 2015/0101899 A1  Apr. 16, 2015

(51) Int. Cl.
| | |
|---|---|
| A42B 3/00 | (2006.01) |
| F16F 9/32 | (2006.01) |
| A42B 3/12 | (2006.01) |
| B29C 67/00 | (2017.01) |
| B33Y 80/00 | (2015.01) |
| B33Y 30/00 | (2015.01) |
| A41D 13/015 | (2006.01) |
| B29L 31/52 | (2006.01) |

(52) U.S. Cl.
CPC .......... *F16F 9/3207* (2013.01); *A41D 13/015* (2013.01); *A42B 3/121* (2013.01); *A42B 3/122* (2013.01); *B29C 67/0059* (2013.01); *B33Y 30/00* (2014.12); *B33Y 80/00* (2014.12); *B29L 2031/52* (2013.01)

(58) Field of Classification Search
CPC ........ A41D 13/0518; A42B 3/00; A42B 3/06; A42B 3/122
USPC ......... 2/267, 411–413, 918, DIG. 3, DIG. 10
See application file for complete search history.

(56) References Cited

U.S. PATENT DOCUMENTS

| | | | | |
|---|---|---|---|---|
| 1,542,675 A | * | 6/1925 | Demuth ............... | B60N 2/7088 |
| | | | | 137/565.34 |
| 3,039,109 A | * | 6/1962 | Simpson ................ | A42B 3/121 |
| | | | | 2/413 |
| 3,713,640 A | * | 1/1973 | Margan .................. | F16F 13/06 |
| | | | | 2/413 |

(Continued)

FOREIGN PATENT DOCUMENTS

CA  2568989 A1 * 1/2006 ............. A42B 3/122

OTHER PUBLICATIONS

International Search Report—International Appln No. PCT/US2014/059774 dated Mar. 3, 2015, 2 pages.

*Primary Examiner* — Tejash Patel
(74) *Attorney, Agent, or Firm* — Sideman & Bancroft LLP; Guy W. Chambers (57) ABSTRACT

Custom fitting protective athletic equipment composed of larger compressive chambers to generally surround a body part as well a plurality of smaller compressive chambers, which can be shaped to absorb rotational impact forces, outside the larger compressive chambers. A hard or yielding shell positioned either outside the chambers or between them can provide additional impact dampening and protection. Both the larger and smaller compressible chambers preferably contain compressible fluid, such as air, another gas, gel or liquid. Valves are preferably provided in the chambers so that the fluid can be controlled when an impact is received. A method is also disclosed to use three-dimensional scanning techniques and three-dimensional 3D printer manufacturing techniques to produce the protective athletic equipment of the present invention.

25 Claims, 7 Drawing Sheets

(56) References Cited

U.S. PATENT DOCUMENTS

| | | | | |
|---|---|---|---|---|
| 3,872,511 | A | * | 3/1975 | Nichols ................. A42B 3/121 2/413 |
| 4,354,284 | A | * | 10/1982 | Gooding ................ A42B 3/121 2/413 |
| 4,586,200 | A | * | 5/1986 | Poon ..................... A42B 3/122 2/413 |
| 5,014,366 | A | * | 5/1991 | Discipio, Sr. .......... A42B 3/061 2/410 |
| 5,039,035 | A | | 8/1991 | Fitzpatrick |
| 5,815,846 | A | * | 10/1998 | Calonge ................ A42B 3/121 2/413 |
| 6,131,196 | A | | 10/2000 | Vallion |
| 6,418,564 | B1 | | 7/2002 | Sheridan |
| 7,234,812 | B2 | * | 6/2007 | Piorkowski ........... A42C 2/007 2/410 |
| 7,895,681 | B2 | | 3/2011 | Ferrara |
| 8,046,845 | B1 | | 11/2011 | Garcia et al. |
| 2006/0101559 | A1 | | 5/2006 | Moore, III et al. |
| 2006/0242746 | A1 | | 11/2006 | Hashash |
| 2007/0014272 | A1 | | 6/2007 | Mazzarolo |
| 2011/0056004 | A1 | | 3/2011 | Landi |
| 2012/0102630 | A1 | | 5/2012 | Anderson |
| 2013/0025035 | A1 | | 1/2013 | Turner |
| 2013/0025036 | A1 | | 1/2013 | Tumer |
| 2013/0025037 | A1 | | 1/2013 | Turner |

* cited by examiner

PROTECTIVE ATHLETIC EQUIPMENT

FIELD OF THE INVENTION

The invention relates to protective athletic equipment that is preferably custom fitted to the user, as well as processes for manufacturing such equipment. The protective athletic equipment of the present invention includes protective helmets as well as protective pads and wraps for other parts of the body. The protective structures can be designed to optimally protect an impacted body or object from damage and have attributes that are customized to provide optimum impact attenuating responses over the widest range of impact energies.

BACKGROUND OF THE INVENTION

Sports injuries are a serious problem. In football, for example, torn anterior cruciate (ACL) knee ligaments are common. The ACL is one of four ligaments that stabilize the knee and prevents excessive or abnormal range of motion. Football, due to its high impact and high contact movements, makes it one of the most common sports with ACL sprains and tears. Concussions are also a major problem in football. More than 100 lawsuits have been filed and settled against the National Football League (NFL) by players claiming that the NFL did not do enough to inform and protect them from the brain injuries caused by repeated blows to the players' heads. While the NFL has an unwavering commitment to player health and making the game safer at all levels, protective equipment still remains a challenge. When it comes to concussions, football helmet safety has made little progress over the past decades. A team of Ohio researchers from Cleveland Clinic's Spine Research Laboratory and Case Reserve University tested eleven commonly used modern polycarbonate helmets and two early $20^{th}$ century "leatherhead" helmets. Using the same testing as the National Operating Committee on Standards for Athletic Equipment (NOCSAE), the researchers found the old and new helmets performed equally. In some impacts, the leather helmets performed better. Serious sports injuries are hardly limited to football, though. It is well documented that injuries are also a serious problem in other sports, such as bicycling, soccer, baseball, hockey, basketball etc.

A sizable industry has developed to try to protect players from the type of injuries commonly caused by their sports. In football, for example, players are required to wear helmets to protect their heads from concussion. These helmets generally consist of a softer, dense inner layer, such as polyurethane foam or vinyl foam, placed next the player's head and a hard exterior polymer shell, such as polycarbonate. Inflatable bladders have also been used for some soft inner layers of football helmets. Examples of inflatable bladders for helmets are provided in Sheridan's U.S. Pat. No. 6,418,564, Fitzpatrick's U.S. Pat. No. 5,039,035, Anderson's U.S. Patent Application Publication No. 2012/0102630 and Moore's U.S. Patent Application Publication No. 2006/0101550. Metal or plastic rods are then attached to the helmet to protect the player's face, while still allowing the player to see the game.

Figure 1A:
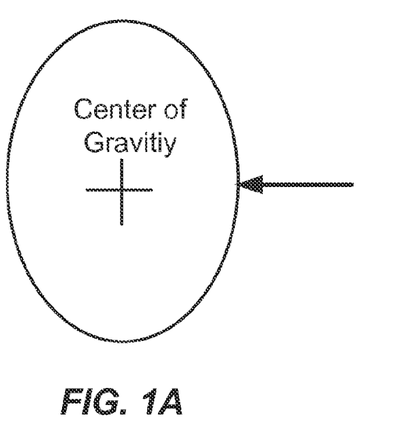
FIGS. 1A-1C illustrates the linear and rotational forces that can be generated by a blow to the head during sports activities.
Figure 1B:
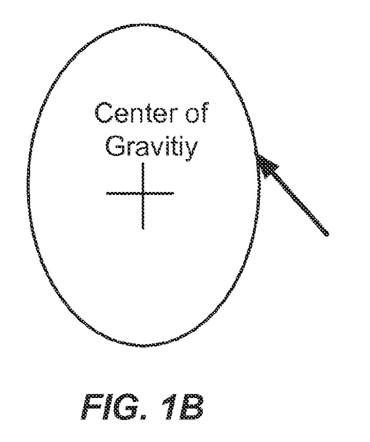
Figure 1C:
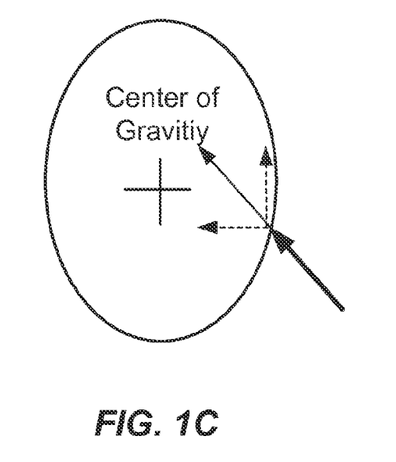

Despite years of work to try to perfect helmet technology for football and other sports, concussions remain a serious problem. The CDC estimates that as many as three million, eight hundred thousand sports-related concussions occur in the U.S. each year. Concussions happen deep in the brain's white matter when forces transmitted from a big impact strain nerve cells and their connections, the axons. Different types of forces are involved in blows or impacts to a body. Impacts can have both linear and rotational forces. As illustrated in FIG. 1A, the linear force is a straight-line force directed at the body part's center of gravity. By comparison, as shown in FIG. 1B, the rotational force occurs most acutely during angular impacts where the force is not directed at the body part's center of gravity. As illustrated in FIG. 1C, the rotational impact force typically has a linear component and a glancing, tangential component. Research shows that the brain only needs to move a little bit when struck, just millimeters, to cause a concussion. Yet no helmets have been produced to optimally absorb, dampen and protect against the few millimeters of brain motion that causes the damage. It appears that commercial sports helmets made from hard or stiff foams result in hard landings.

The boldest safety claim from mainstream football helmet makers comes from Riddell. Riddell's "360" helmet builds upon a system called "Concussion Reducing Technology" (CRT) which, in essence, only adds more padding. The attempt by Riddell was to use hinge clips on the sides and face mask to disperse frontal impacts. It also uses a hexagonal liner system of foam and an inflatable back, neck and side. Another approach by Peter Hallidin, a biomechanical engineer at the Royal Institute of Technology in Stockholm, Sweden is a "Multidirectional Impact Protection System" (MIPS), which is also the name of a company he co-founded. The idea of MIPS is to fit a plastic layer snugly on a head beneath the padding in a helmet. By allowing the head to float during an impact, MIPS can dampen some of the rotational force before it makes its way to the brain. The plastic layer, though, will obviously not allow keeping the head cool. The Bicycle Helmet Safety Institute ("BHSI") lists "Ten Principles for the Ideal Helmet" and concludes no one makes such a helmet. The number one priority on the wish list is a helmet that will manage as much energy as possible and obtain a soft landing. BSHI reveals that the lab tests for helmet standards are pass/fail tests and, as such, are not designed to show "softer landing" protection possibilities. Moreover, legal worries prevent companies from advertising anything about impact performance beyond meeting the standard, a point that can be defended in court even if the user is injured.

Over four million, two hundred thousand persons in the United States will suit up and play football each year. Most of them are children with still developing brains. Many more millions will ride bikes and play all other types of sports. Every one of them needs more optimal protection of head, knees and other body parts.

BRIEF SUMMARY OF THE INVENTION

The present invention provides a novel soft landing impact energy management protective system that can also be custom fitted. The system provides a superior level of protection as compared with existing technology, particularly in adding simultaneous rotational impact management to the standard linear impact management systems. In a preferred embodiment, the present invention provides two levels of compressible chamber protection. Relatively larger, primarily linear impact absorbing, compressible chamber structures generally surround the body part to be protected, such as a head, elbow or knee. The present invention can also be used for inanimate objects, such as car bumpers or shipping materials. Attached to the outside of the larger structure are a plurality of relatively smaller, primarily rotational impact absorbing, compressible chamber structures, which can be of varied, uniform or non-uniform shapes.

Both the larger and smaller structures preferably contain compressible fluid, such as air, other gases (e.g., helium), gel or liquid. Valves are preferably provided in the chambers so that pressure can be released when an impact is received, similar to the way air is released after the initial inflation of an air bag during an automobile accident. The valves are preferably formed to allow the chambers to re-inflate after the force of the blow is dissipated, most preferably the chambers will re-inflate by themselves so that the structure is promptly ready to protect against another blow. The larger and smaller chambers of the present invention can also be used in conjunction with a hard or yielding shell. Preferably, the shell is located between the larger and smaller compressible chambers. Alternatively, the shell can be either on the inside or outside of the chambers.

In addition to the preferred compressible chamber structures, the present invention also provides a novel method to form fit the protective equipment to the athlete's body. This method preferably begins by three-dimensionally scanning of the athlete's body part and placing that scanned image in computer storage. Using the scanned image, the form fitting protective equipment can then be electronically designed, preferably through the use of computer-aided design (CAD) software. That CAD image of the form-fitting protective equipment can then be used to operate a 3-D printer to make the form-fitting protective equipment layer-by-layer. This 3-D printing technology provides much more flexibility and commercial practicality than existing injection molding or blow molding technology, particularly for producing integrated, larger and smaller compressive chambers with valves.

DETAILED DESCRIPTION OF THE INVENTION

Figure 2:
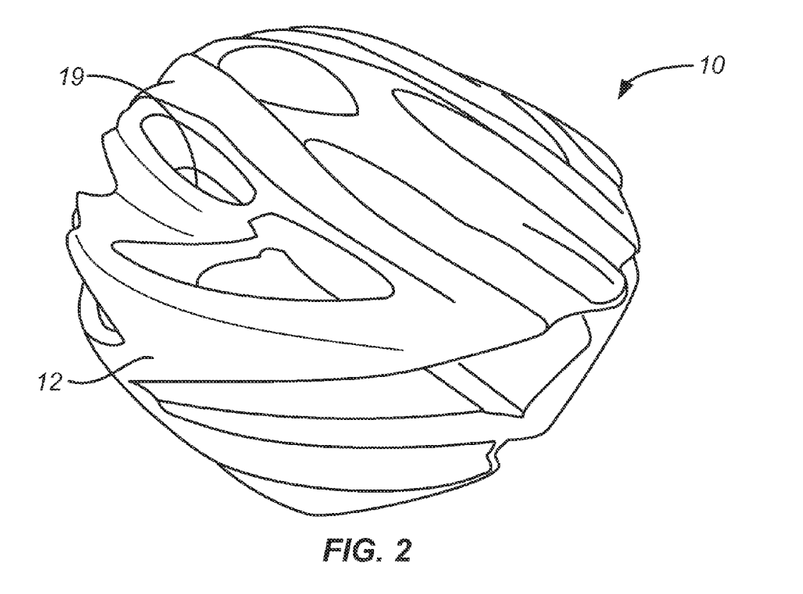
FIG. 2 is a top perspective view of a bicycle helmet.
Figure 3:
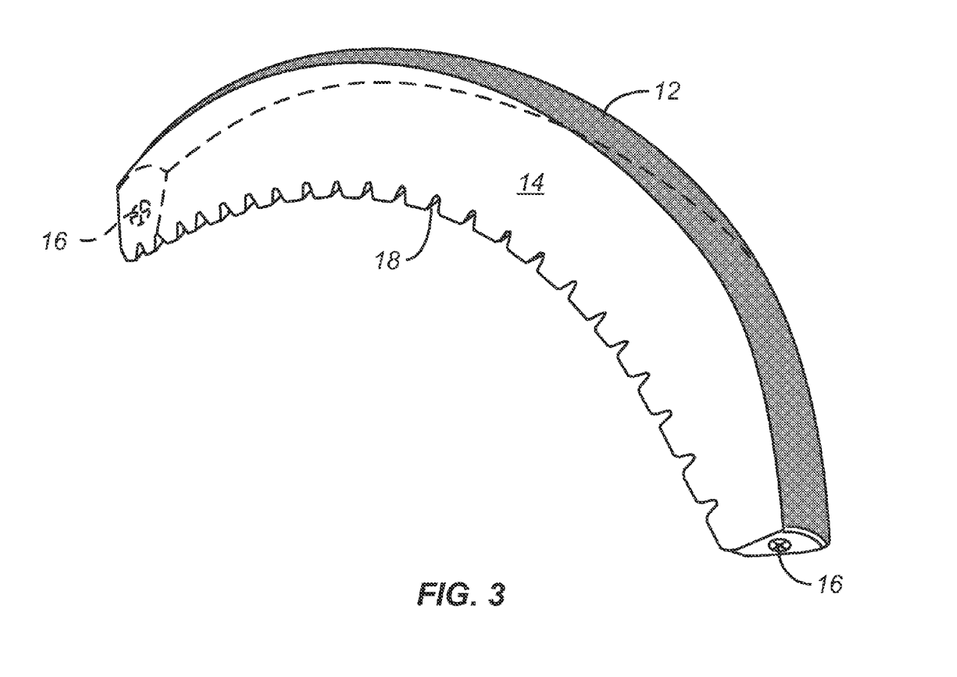
FIG. 3 shows a cutaway view of the bicycle helmet of FIG. 2 illustrating a larger protective chamber of the present invention.

FIGS. 2 and 3 illustrate a preferred embodiment of the present invention being used in a bicycle helmet 10. In this case, the bicycle helmet is formed with a hard or yielding outer shell 12 and one or more larger inner compressive chambers, cells or membranes of the present invention 14. The outer shell 12 is preferably formed from a hard or yielding polymer, such as polycarbonate, which serves primarily to block an object from contacting the user's head and, if yielding, to spread the impact force. Between the outer shell 12 and the user's head is a cushion layer, which is preferably in the form of one or more fluid containing larger compressive chambers 14. Each larger chamber 14 is preferably formed from a softer, flexible polymer, such as a flexible thermoplastic polyurethane (TPU) or flexible thermoplastic elastomer (TPE). Suitable, commercially available TPEs include Arnitel®, Kraton and Santoprene™. The fluid used in the larger compressive chamber 14 is preferably air, another gas (e.g., helium), gel or liquid. Alternatively, the larger chamber can be formed as a solid unitary piece. The larger chamber 14 preferably has one or more valves 16 to allow fluid to pass into and, during impact, to be released from the larger chamber 14 during impact. The combination of the fluid and valves 16 provides the benefits of compression dynamics. For example, in the event of a higher, increased energy impact, the fluid does not flow so easily through the valves 16 as compared to the flow under lower energy impacts. The fluid actually behaves as a more sensitive mechanism under high impact energy as compared with softer, less resistive behavior under lower impact energy. Grooves 18 might advantageously be formed in the large chamber 14 next to the user's head to allow air to circulate and thereby keep the user's head cool. Gaps 19 may also be formed in the helmet 10 and large chamber 14 as another way of promoting air circulation.

In one preferred embodiment, the larger compressive chambers 14 of the present invention are preferably made in accordance with the disclosure of Ferrara's U.S. Pat. No. 7,895,681 ("Ferrara patent"), the disclosure of which is hereby incorporated by reference. The Ferrara patent teaches how the large chamber can be customized to provide an optimal response to impacts over a broad range of impact energies by carefully selecting the material from which the chamber is fabricated, the thickness of its various wall sections, the geometry of the chamber, the fluid placed within the chamber and the location of the chamber valves. The Ferrara patent also teaches how the chamber can be formed to release fluid during impact and then reform with fluid into its original shape after impact.

Figure 4A:
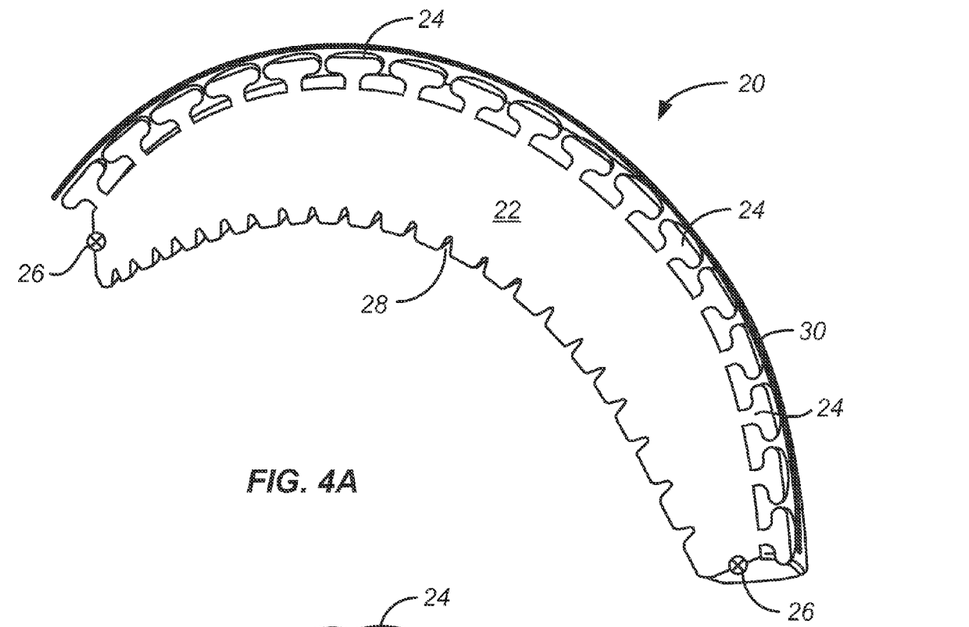
FIG. 4A is a cutaway view of a helmet of the present invention having both larger and smaller compressive chambers as well as a hard or yielding exterior shell.
Figure 4B:
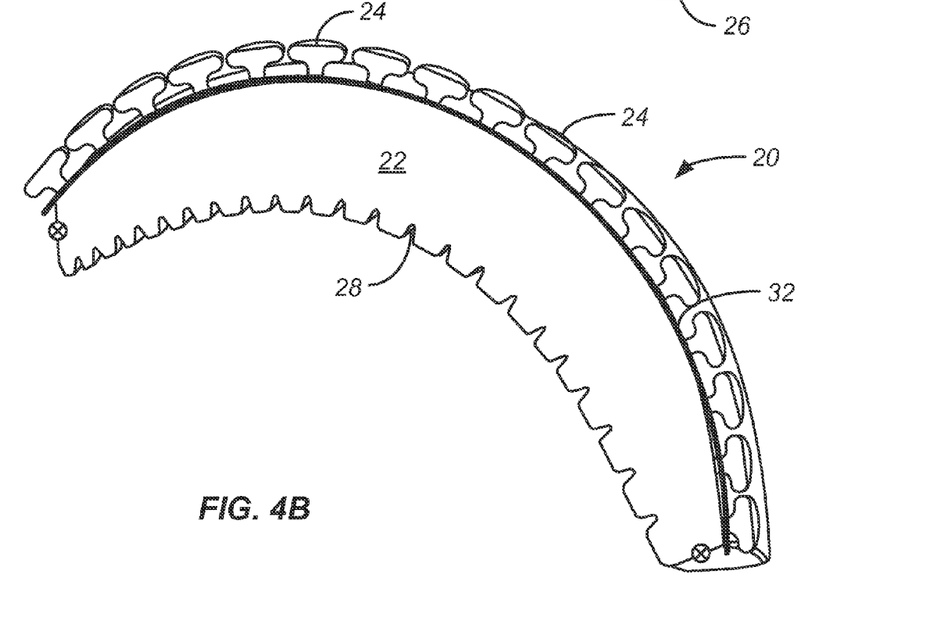
FIG. 4B is a cutaway view of a helmet of the present invention having both larger and smaller compressive chambers as well as a hard or yielding shell between the compressive chambers.
Figure 4C:
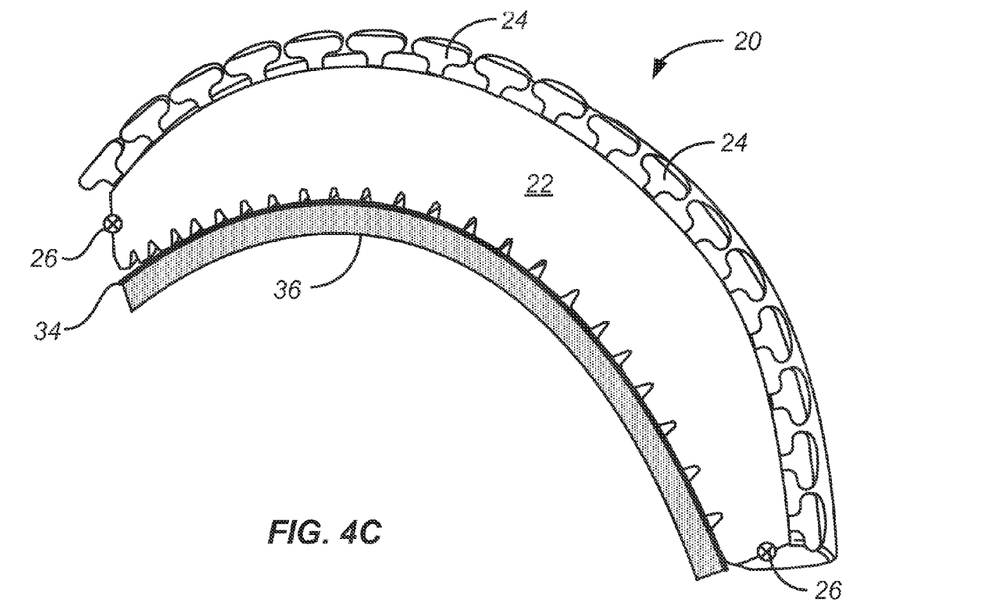
FIG. 4C is a cutaway view of a helmet of the present invention having both larger and smaller compressive chambers as well as a hard or yielding shell underneath the larger compressive chamber.

FIGS. 4A-4C show three additional preferred embodiments of a helmet 20 of the present invention. Like the helmet shown in FIGS. 2 and 3, the helmets of FIGS. 4A-4C features one or more larger compressive chambers 22, a hard or yielding shell 30, 32, 34, larger chamber valves 26 and also grooves 28 to promote air circulation. The helmets shown in FIGS. 4A-4C differ from the helmet shown in FIGS. 2 and 3 through the addition of multiple smaller compressive chambers 24 onto the outside of the larger chamber 22 and by changing the location of the hard or yielding shell 30, 32, 34.

In the FIGS. 4A and 4C embodiments, the smaller chambers 24 are preferably formed integrally with the larger chamber 22 to share a common interior space and are formed in the shape of mushrooms. While the larger chamber 22 dissipates most of the overall force of a blow, particularly the linear force, the smaller chambers 24 are formed primarily to dissipate the rotational force of a blow through a torque sliding motion. This torque sliding motion is similar to the ability of human skin to dissipate a glancing blow. When the human skin receives a glancing blow, it will initially compress and slide over the muscle or bone to dampen the rotational energy and then it will stop yielding whereupon the muscle compresses and disperses the impact. After the force of a rotational blow is dissipated, the smaller chambers preferably have memory and are resilient enough to return to their original positions. The smaller chambers 24 may either contain fluid, such as air, other gases, gel or liquid, or be formed as a soft, solid cushioning unitary piece.

FIGS. 4A-4C illustrate how a hard or yielding shell 30, 32, 34 can be placed in different positions with respect to the chambers 22, 24 of the present invention. In FIG. 4A, the hard or yielding shell 30 is placed outside of both the larger 22 and smaller 24 chambers. Having the shell 30 on the outside of the helmet corresponds most closely with the configuration of conventional sports helmets. While placing the shell 30 on the outside better protects the softer larger chambers 22 from damage and environmental contamination as compared with the FIG. 4B-4C embodiments, it is not as effective at cushioning the head from a rotational impact. FIG. 4B shows the hard or yielding shell 32 placed between the larger 22 and smaller chambers 24. This configuration better allows the smaller chambers 24 to slide, deform and absorb energy when subjected to a rotational blow and thereby better dissipate the impact energy of that blow before the lineal energy is transferred to the larger chamber. The rotational energy absorption and lineal energy absorption occur almost, but not quite, simultaneously, thus producing the desired soft landing. This embodiment has the disadvantage of leaving the small compressive chambers 24 more exposed to damage and environmental contamination, but this is correctable by encasing the smaller compressive chambers 24 in a thin, reduced friction, flexible skin. Also, it may be more difficult to manufacture the hard or yielding shell 32 between the two chambers 22, 24, particularly if one wants the chambers 22, 24 to be formed integrally with one another. As an alternative, the shell 32 may be made with holes or slots and placed between the two chambers 22, 24 by inserting the smaller chambers 24 through the openings in the shell 32. In the FIG. 4C embodiment, the hard shell 34 is inside of the two chambers 22, 24 (i.e., closer to the user's head). An extra soft cushioning layer 36 may advantageously be added under the hard shell 34 in this embodiment to make the helmet 20 more comfortable to wear and for proper fitting.

Figure 5:
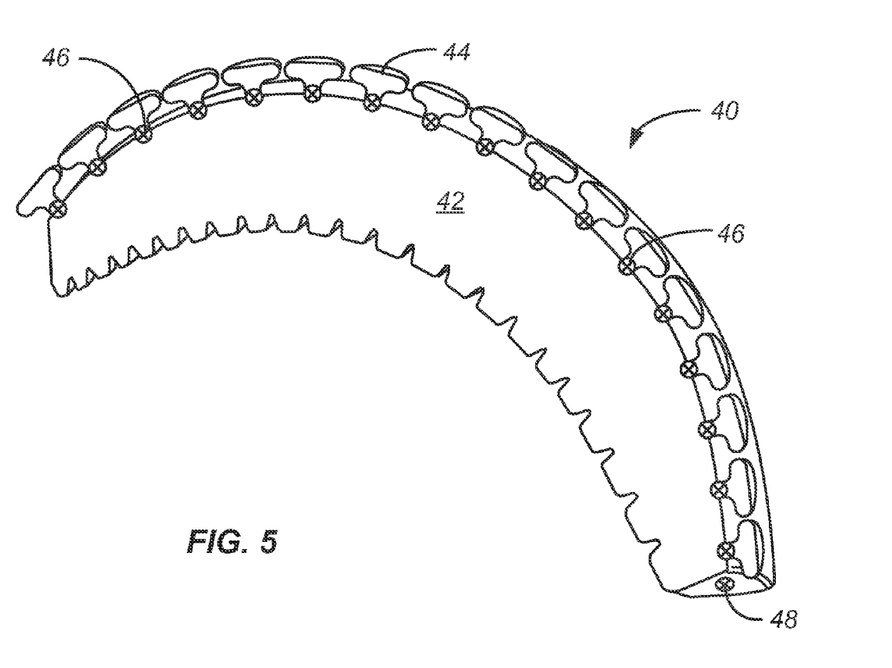
FIG. 5 is a cutaway view of a helmet of the present invention illustrating how the smaller compressive chambers can each have valves to allow fluid to be released into the larger chamber.

FIG. 5 illustrates how valves 46 can be placed at the bottom of each mushroom shaped smaller compressive chamber 44 in a further alternative embodiment for the helmet 40 of the present invention. These smaller chamber valves 46 allow the smaller chambers 44 to be maintained at a different pressure and firmness than the large chamber 42. Also, an impact which causes fluid to be released through the larger chamber valve 48 will not necessarily cause a comparable loss of fluid pressure in the smaller chambers 44.

Figure 6A:
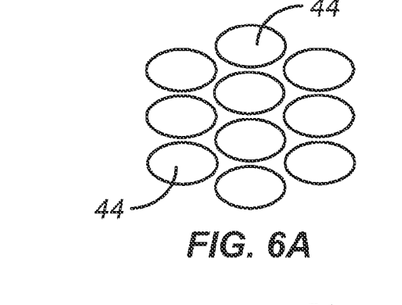
FIG. 6A-D illustrate how the smaller compressive structures can be made in different shapes and patterns.
Figure 6B:
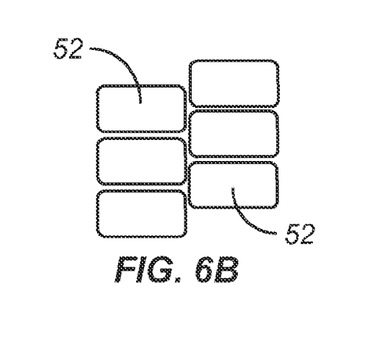
Figure 6C:
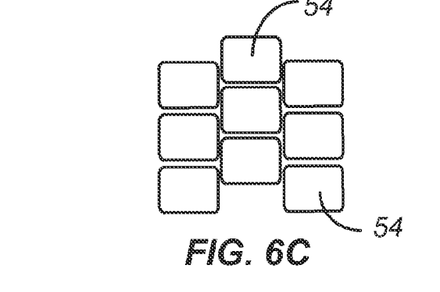
Figure 6D:
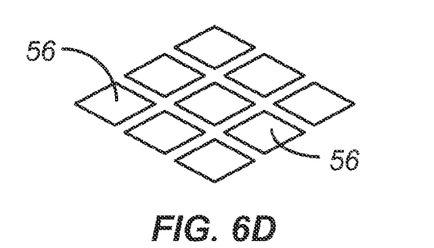

FIGS. 6A-6D illustrate how the smaller chambers and structures of the present invention can be formed in different shapes and sizes. FIG. 6A shows an oval shape top view of the round mushroom shaped smaller structure 44 illustrated in previous FIG. 5. These oval shaped smaller chambers 44 are preferably patterned in offset rows and columns to better help achieve their function of dissipating rotational force impacts. FIGS. 6B-6C show that the smaller chamber heads 52, 54 can also be rectangular or square in shape, instead of round, again being patterned in offset rows and columns. FIG. 6C shows that the smaller chamber heads 56 can also be diamond shaped, while still being patterned in offset rows and columns.

Figure 7A:
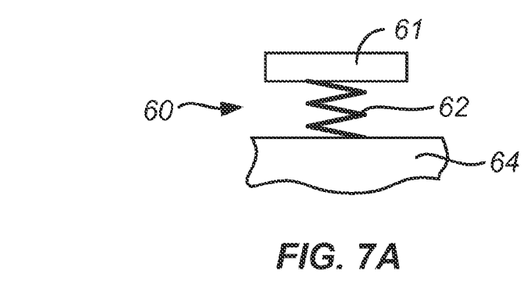
FIG. 7A-B illustrates how spring structures can be substituted for smaller compressive chambers to provide protection against rotational impacts.
Figure 7B:
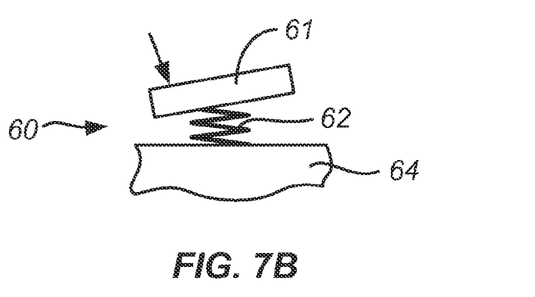
Figure 7C:
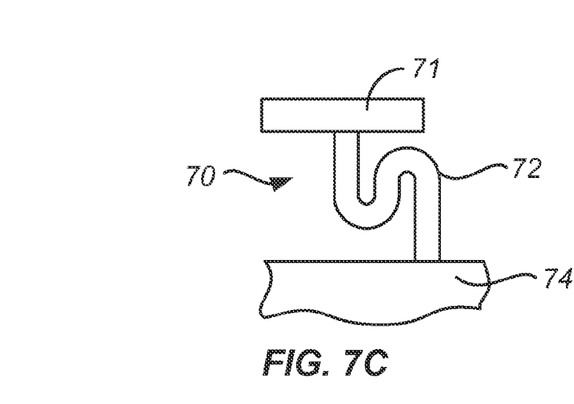
FIG. 7C-D illustrates how tubular compressible structures can be substituted for smaller compressive chambers.
Figure 7D:
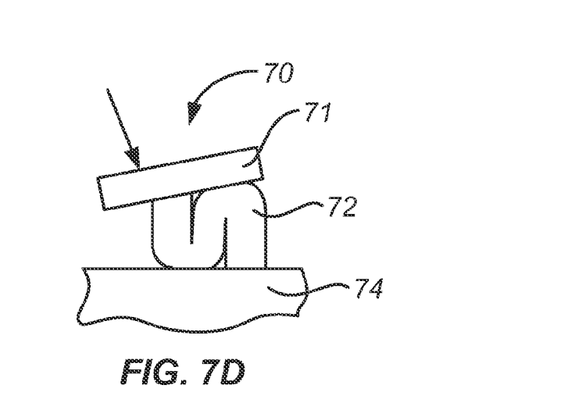

FIGS. 7A-7B shows how small spring structures 60 can be used in place of mushroom shaped smaller chambers 24, 44. In FIG. 7A, for example, the spring structure consists of a horizontally reciprocating spring 62 positioned between an upper contact surface 61 and a lower contact surface 64. When a blow is received on the upper contact surface 61 of the spring structure 60, the spring 62 will compress as shown in FIG. 7B and thereby absorb, rather than transmit, force from the blow. A similar structure 70, this time with a flexible tube 72, is shown in FIG. 7C. In the FIG. 7C embodiment, the tube 72 is positioned between an upper contact surface 71 and a lower contact surface 74. The tube 72 can advantageously be made from a flexible polymer. As shown in FIG. 7D, a blow to this tubular structure 70 also results in the tube 72 absorbing force from the blow.

Figure 8:
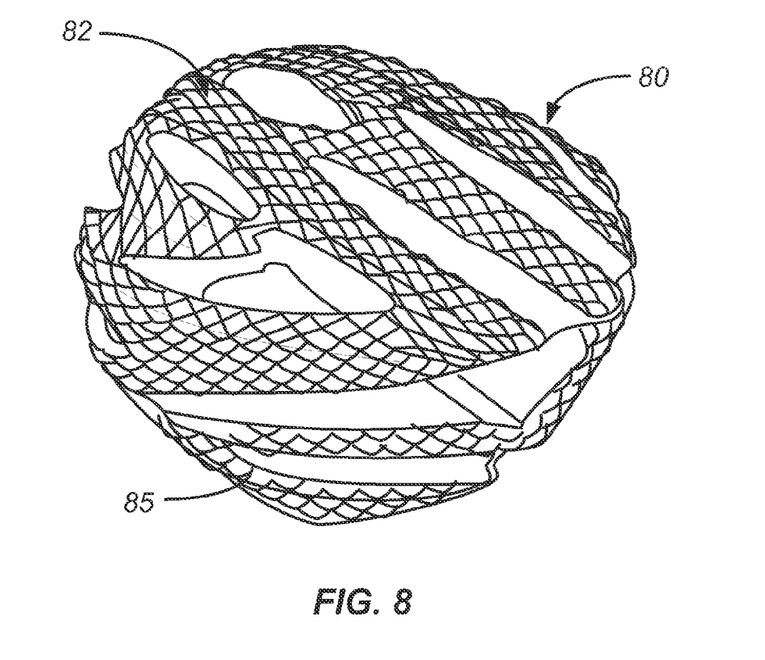
FIG. 8 shows a bicycle helmet with the smaller exterior compressive chambers of the present invention on the exterior.
Figure 9:
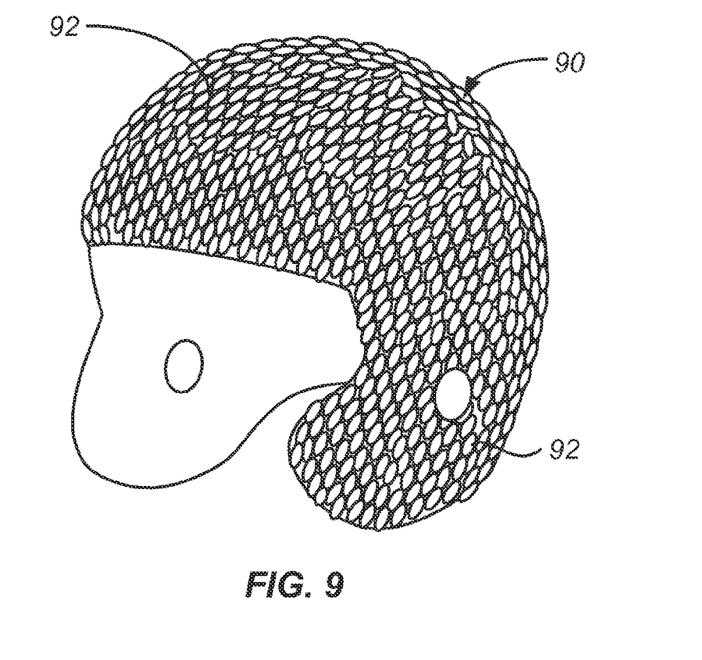
FIG. 9 shows a football helmet with the smaller exterior compressive chambers of the present invention on the exterior.
Figure 10:
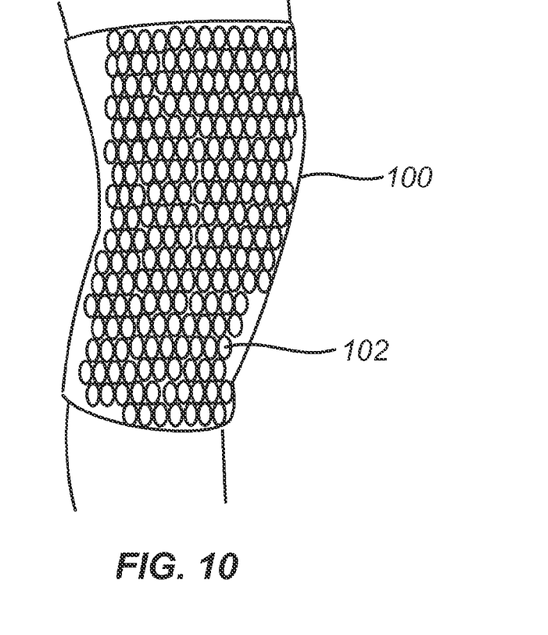
FIG. 10 shows a knee or elbow protector with the smaller exterior compressive chambers of the present invention on the exterior.
Figure 11:
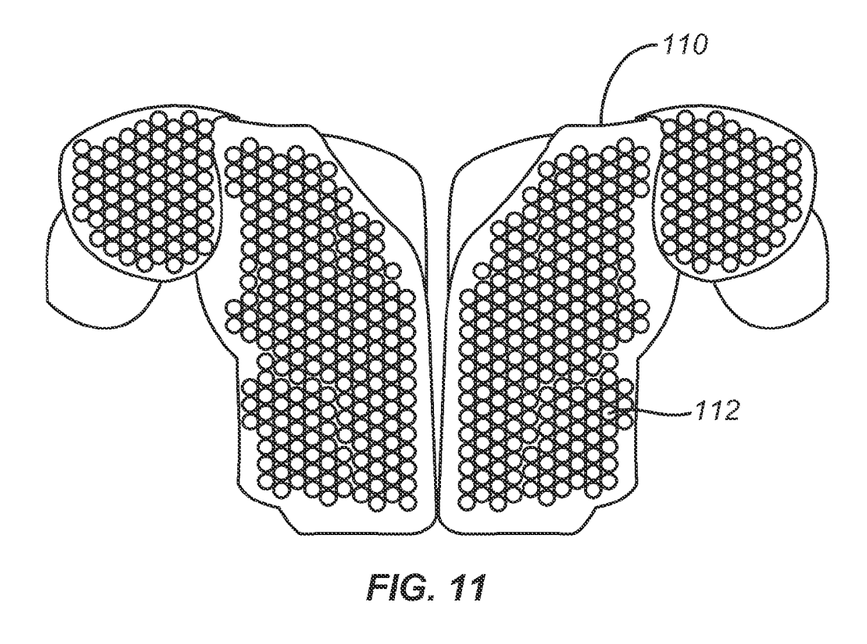
FIG. 11 shows football shoulder pads with the smaller exterior compressive chambers of the present invention on the exterior.

FIG. 8 shows how a bicycle helmet 80 of the present invention might look with diamond shaped smaller chambers 82 on its exterior surfaces. If desired, they can be aesthetically patterned and covered cosmetically with a thin, strong, yielding, frictionless skin for decreased torque and aesthetic, athletic looking appearances. FIG. 9 shows how a football helmet 90 of the present invention might look with oval form mushroom shaped smaller chambers 92 on its exterior surfaces. Because the present invention provides superior protection as compared with conventional designs, slots 85 can be formed in the FIGS. 8 and 9 helmet to allow better ventilation. Similarly, FIGS. 10 and 11 show how protective knee or elbow pads 100 and football shoulder pads 110 might look with mushroom shaped smaller chambers 102, 112 on their exterior surfaces. As previously noted, polymer spring or tubular structures could alternatively be used in place of these mushroom shaped smaller chambers 82, 92, 102, 112. In each of these protective structures, there is a flexible outer structure that serves as a rotational force dampener that is preferably integrated with an interior larger chamber that serves as a better linear impact force dampener.

To increase its effectiveness, the protective athletic equipment of the present invention is preferably custom fitted to the athlete's body. In one preferred embodiment, this custom fitting starts by producing three-dimensional scanned images of the body part to be protected. One method to scan body parts to produce three-dimensional scanned images is described in Landi's U.S. Patent Application Publication No. 2011/0056004, the disclosure of which is hereby incorporated by reference. As described in the Landi publication, a laser scanning system can be used which relies on the principal of laser triangulation. By making a triangle between the scanner lens, laser and the body part being scanned, accurate three dimensional data can be obtained.

The distance between the scanner lens and laser is known, and with the angle of laser given by a galvanometer, all information is provided to obtain X, Y, Z coordinates of the body part surface being scanned. The laser is swept across a portion of the body part by the galvanometer, which rotates a small mirror that reflects the laser. The surface of the body part is then focused through the lens and captured by a charge-coupled device (CCD) inside the scanner. A dense point cloud is produced through manipulation of the data via software. One such system, the ES-Scan model, is available from the 3D Digital Corp. of Sandy Hook, Conn.

To produce a 3D image of an entire body part, a collection of scanned images for portions of the body part may need to be merged. 3D software, such as SLIM 3D software produced by 3D-Shape of Germany, is available for this process of merger and integration. The SLIM software merges and aligns scans together based on common feature recognition between scans, and then registers the scans globally as one 3D model. As long as there is an overlap and common features among two scans, the software can automatically align the data. If there is not enough crossover or common features between the scans, markers are used in the software to align and merge the scans. The software also smoothes, fills holes, and refines the scans to give a clear image of the body part. The resulting 3D digital model is easily exported into popular 3D software formats, edited and manipulated using third party application software, such as computer-aided design (CAD) software.

The three-dimensional data representation of a body part can also be obtained using other technologies. For example, a coordinate measuring machine (CMM) can be used. A CMM is a device for measuring the physical geometrical characteristics of an object. The machine may be manually controlled by an operator or it can be used on a computer control. Measurements are defined by a probe attached to a third moving axis of the machine. The probe may be mechanical, optical, laser, or white light. One such CMM is available from Brown & Sharp of North America, Mitutoyo of Japan and Starrett of North America. Other techniques include a casting process whereby settable material is formed around the body part and set to create a mold when separated. Additionally, the three-dimensional data can be obtained through hand measurements.

Once the dimensions of a body part to be protected are obtained, the protective athletic equipment is typically made today by injection molding or blow molding. Injection molding is a manufacturing process for producing parts by injecting material into a mold. Material for the part is fed into a heated barrel, mixed and forced into a mold cavity where it cools and hardens to the configuration of the cavity. Blow molding is a manufacturing process by which hollow parts are formed. In general, there are three main types of blow molding: extrusion blow molding, injection blow molding and stretch blow molding. The blow molding process begins with melting down the plastic and forming it into a parison or preform. The parison is a tube-like piece of plastic with a hole in one end in which compressed air can pass through. The parison is then clamped into a mold and air is pumped into it. The air pressure then pushes the plastic out to match the mold. Once the plastic has cooled and hardened, the mold opens and the part is ejected.

While molding processes could theoretically be used to produce some or all of the protective athletic equipment of the present invention, 3D printing is the preferred manufacturing process because of its versatility and commercial practicality. 3D Printing is a process whereby a 3D representation of a body part is created by a computer using, for example, the 3D scanning processes previously described. Using the 3D image of the body part stored in a computer, a computer image of the suitable protective athletic equipment of the present invention is created using CAD software to closely match the dimensions of the body part. The 3D CAD image of the protective athletic equipment is then sent to a 3D printer. The 3D printer control uses the 3D information about the protective athletic equipment to build up a series of "slices" of the protective athletic equipment, each slice representing one layer of material for the protective athletic equipment. As the 3D printer lays down a thin layer of material for each slice, one on top of the other, the various layers gradually build up to form the 3D protective athletic equipment. To the extent injection molding or blow molding is used to produce the protective athletic equipment of the present invention in place of the 3D printer, the 3D printer can be used to produce a casting of the body part for the molding process. Suitable 3D printers for the protective athletic equipment of the present invention can be obtained from such companies as Stratasys Ltd., of Minneapolis, Minn. and 3D Systems of Rock Hill, S.C.

In the foregoing specification, the invention has been described with reference to specific preferred embodiments and methods. It will, however, be evident to those of skill in the art that various modifications and changes may be made without departing from the broader spirit and scope of the invention as set forth in the appended claims. For example, while the present invention has been described in the context of protective athletic equipment, those of skill in the art will recognize that the principles of the present invention can be used for other applications, such as for car bumpers or shipping materials. The specification and drawings are, accordingly, to be regarded in an illustrative, rather than restrictive sense; the invention being limited only by the appended claims.

What is claimed is:

1. A structure for protecting a body part from impact damage comprising:
   a flexible larger compressive chamber holding fluid inside with a surface positioned to contact or approximately contact said body part; and,
   a plurality of flexible smaller compressive chambers each holding fluid inside in fluid connection through an aperture with said larger compressive chamber and arrayed on an outer surface of said larger compressive chamber positioned away from said body part;
   wherein each of said smaller compressive chambers is capable of independent multi-dimensional movement when a rotational and/or lineal force is applied to it.

2. The structure of claim 1 wherein each smaller compressive chamber has a valve in said aperture separating it from said larger compressive chamber.

3. The structure of claim 1 wherein said fluid is air, another gas, gel or liquid.

4. The structure of claim 1 wherein said smaller compressive chambers are formed integrally with said larger chamber so as to share common interior space.

5. The structure of claim 1 further comprising a peripheral aperture to allow fluid to flow into or out of said larger compressive chamber.

6. The structure of claim 2 wherein said valves allow fluid to flow into or out of said smaller chambers.

7. The structure of claim 6 wherein the fluid pressure for said smaller compressive chambers can be made to be different than the fluid pressure in said larger compressive chamber.

8. The structure of claim 1 wherein said larger and smaller compressive chambers are formed from a flexible thermoplastic polymer.

9. The structure of claim 8 wherein said thermoplastic polymer is either thermoplastic polyurethane (TPU) or thermoplastic elastomer (TPE).

10. The structure of claim 1 further comprising a hard or yielding polymer shell.

11. The structure of claim 10 wherein said hard or yielding polymer shell is positioned between said larger compressive chamber and said plurality of smaller compressive chambers.

12. A structure for protecting a body part from impact damage comprising:
   a flexible larger compressive chamber holding fluid inside with a surface positioned to contact or approximately contact said body part; and,
   a plurality of flexible smaller compressive chambers each holding fluid inside in fluid connection through an aperture with said larger compressive chamber and arrayed on an outer surface of said larger compressive chamber positioned away from said body part;
   wherein said smaller compressive chambers are positioned between said larger compressive chamber and a hard or yielding polymer shell.

13. The structure of claim 10 wherein said hard or yielding polymer shell is formed from polycarbonate.

14. The structure of claim 1 wherein one or more of said smaller compressive chambers are in the shape of a mushroom.

15. A structure for protecting a body part from impact comprising:
   a flexible larger compressive chamber with fluid inside and a valve to control said fluid, wherein said larger compressive chamber has a surface positioned to contact or approximately contact said body part;
   a plurality of flexible smaller compressive chambers connected through an aperture to said larger compressive chamber and arrayed on an outer surface of said larger compressive chamber positioned away from said body part wherein each of said smaller compressive chambers is capable of independent multi-directional movement when a rotational and/or lineal force is applied to it; and,
   a hard or yielding polymer shell connected to said larger compressive chamber, smaller compressive chambers or both.

16. The structure of claim 15 wherein said smaller chambers are formed integrally with said larger chamber so as to share the same interior space.

17. The structure of claim 15 further comprising a valve in the aperture of one or more of said smaller chambers separating them from said larger compressive chamber.

18. The structure of claim 15 wherein said larger and smaller compressive chambers are formed from a flexible thermoplastic polymer.

19. The structure of claim 15 wherein said structure is configured to protect a user's head.

20. The structure of claim 15 wherein said structure is configured to protect a user's knee or elbow.

21. The structure of claim 1 wherein said larger compressive chamber and/or said smaller compressive chambers are formed from a polymeric material which allows them to resume their original shape after impact.

22. The structure of claim 2 wherein, after impact on a smaller compressive chamber, fluid is released from said smaller compressive chamber into said larger compressive chamber through said valve.

23. The structure of claim 17 wherein, after impact on a smaller compressive chamber, fluid is released from said smaller compressive chamber into said larger compressive chamber through said valve.

24. The structure of claim 5 wherein, after impact, said larger compressive chamber releases fluid out of said structure through said peripheral aperture.

25. A structure for protecting a body part from impact comprising:
   a larger compressive chamber with fluid inside and a valve to control said fluid, wherein said larger compressive chamber has a surface positioned to contact or approximately contact said body part;
   a plurality of smaller compressive chambers connected through an aperture to said larger compressive chamber and arrayed on a surface of said larger compressive chamber positioned away from said body part wherein each of said smaller compressive chambers is capable of independent multi-directional movement when a rotational and/or lineal force is applied to it; and,
   a hard or yielding polymer shell connected to said larger compressive chamber, smaller compressive chambers or both,
   wherein, after impact, said larger compressive chamber releases fluid out of said structure through a larger compressive chamber aperture.

\* \* \* \* \*